Nov. 30, 1948.  C. WARE  2,455,202

PACKING

Filed March 26, 1945

Inventor
Cecil Ware
By
E. V. Hardway,
Attorney

Patented Nov. 30, 1948

2,455,202

UNITED STATES PATENT OFFICE 2,455,202

PACKING

Cecil Ware, Houston, Tex.

Application March 26, 1945, Serial No. 584,871

1 Claim. (Cl. 288—2)

This invention relates to packing.

An object of the invention is to provide a novel type of packing element adapted to form a seal between an outer and an inner part when under compression and which will automatically resume its normal shape when the pressure on it has been relieved.

The conventional type of packing commonly used for forming a seal between an outer and an inner part and such as is used in stuffing boxes, between outer and inner well pipes, and in like places must be expanded, to form an effective seal, by the application of compressive force thereto. However when it is desired to release the packing and the compressive force is relieved the packing remains expanded and must be destroyed or injured in order to effect its removal. The type of packing, herein described, when subjected to compression will readily expand to form the required seal but when the compression is relieved it will contract, and resume its normal shape, so it can readily be removed without injury and can be reused. It is therefore particularly useful as a seal in stuffing boxes, between outer and inner pipes in a well and in like places.

Other objects and advantages will be readily apparent from this specification as illustrated by the accompanying drawings, wherein.

Figure 1:
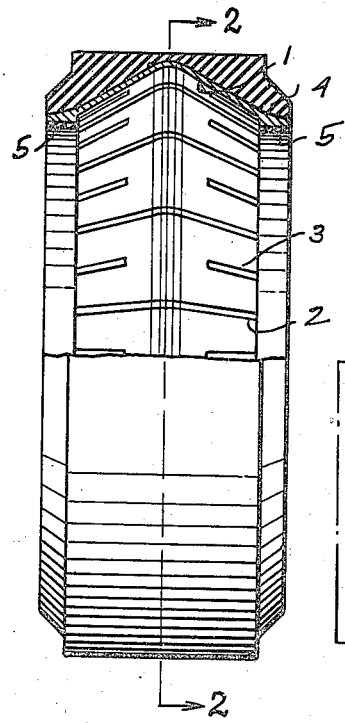
Figure 1 shows a side elevation of one form of the packing, partly in section taken on the line 1—1 of Figure 2.
Figure 2:
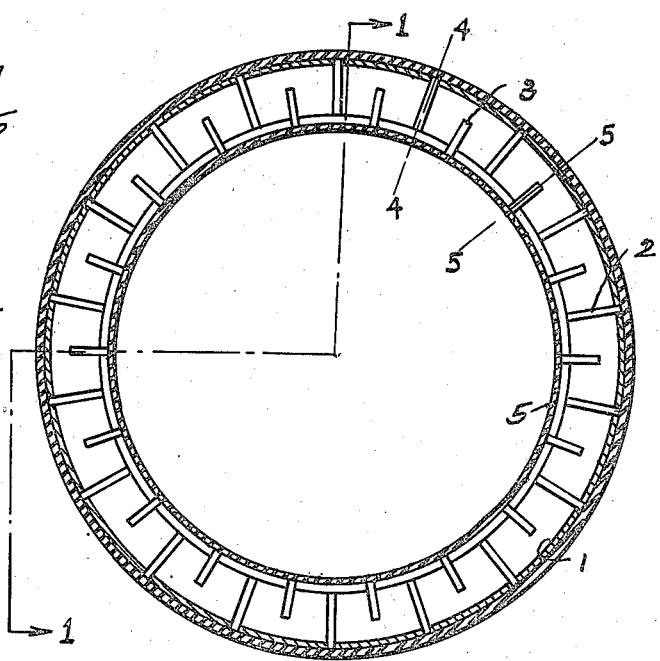
Figure 2 shows a sectional view taken on the line 2—2 of Figure 1.
Figure 4:
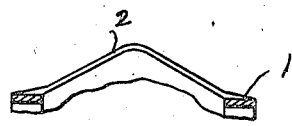
Figure 4 shows a transverse, sectional view of the skeleton, taken on the line 4—4 of Figure 2
Figure 3:
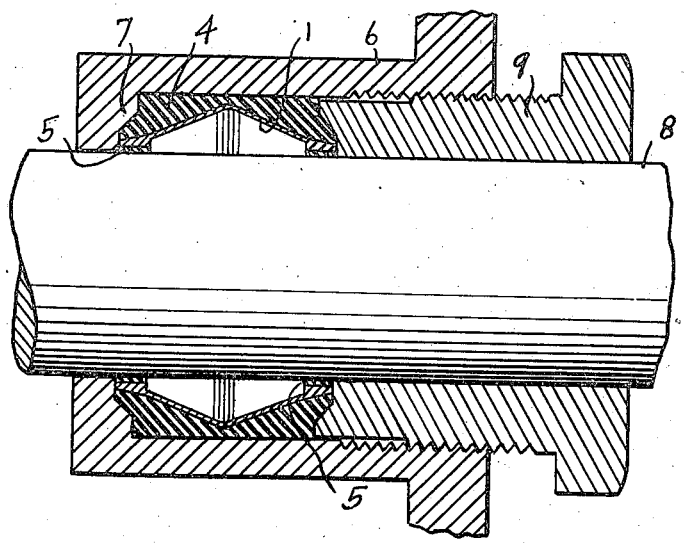
Figure 3 shows a longitudinal, sectional view of a stuffing box showing the packing installed.
Figure 5:
Figure 5 shows a transverse, sectional view thereof, taken on the line 5—5 of Figure 2.

Referring more particularly to the drawings the numeral 1 designates a skeleton which is formed of a sheet of spring steel or other similar material of circular shape and which is, preferably, outwardly arched as is best shown in Figures 1 and 3.

This skeleton has the transverse slots 2 across the arch thereof which are spaced apart therearound, and also has the transverse, marginal slots 3, on each side, in staggered relation with respect to the slots 2.

A resilient packing material 4, such as rubber or plastic will be moulded about the skeleton and, in the process of moulding will be moulded through the slots 2 and will also be moulded through the slots 3 to form the inside packing rings 5, 5 one around each margin of the skeleton on the inside.

The outside packing 4 will form a seal with the outer part, or pipe, and the inside rings 5 will seal with the inner pipe, or part.

One use of the packing is illustrated in Figure 3 wherein the numeral 6 designates a box having an inside annular flange 7 through which a rod, or shaft, 8 works. The packing unit above described may be inserted into the box against the flange 7 and around the rod, or shaft. A gland 9 may then be screwed into the other end of the box against the packing unit to exert a compressive force thereon so as to force the packing outwardly against the inside wall of the box and the seal rings inwardly around the rod or shaft to form close fitting seals. When the gland is unscrewed the springy skeleton will cause the packing to assume its original shape and relax both from the box and shaft and can then be easily removed.

The packing unit may be used as a well packer and when assembled with the well pipe the inner pipe will correspond to the rod or shaft 8 and the outer pipe will correspond to the box.

What I claim is:

A packing unit comprising, an approximately circular skeleton formed of sheet material which is radially arched and which is provided with transverse slots across the arch and transverse marginal slots staggered with respect to the slots across the arch, resilient packing material molded about the skeleton and forming a continuous annular sealing surface on one side of the skeleton and spaced, annular, sealing surfaces on the other side of the skeleton.

CECIL WARE.

REFERENCES CITED

The following references are of record in the file of this patent:

UNITED STATES PATENTS

| Number | Name | Date |
|---|---|---|
| 1,179,562 | Reich | Apr. 18, 1916 |
| 1,739,385 | Bisbee | Dec. 10, 1929 |
| 1,924,555 | Hubbard | Aug. 29, 1933 |
| 2,182,051 | Kurth | Dec. 5, 1939 |
| 2,210,833 | Clough | Aug. 6, 1940 |
| 2,385,156 | Newell | Sept. 18, 1945 |